United States Patent
Fuqua

(10) Patent No.: US 9,488,099 B2
(45) Date of Patent: Nov. 8, 2016

(54) OPPOSED-PISTON ENGINE HAVING A SINGLE CRANKSHAFT COUPLED TO THE OPPOSED PISTONS BY LINKAGES WITH PIVOTED ROCKER ARMS

(71) Applicant: ACHATES POWER, INC., San Diego, CA (US)

(72) Inventor: Kevin B. Fuqua, San Marcos, CA (US)

(73) Assignee: ACHATES POWER, INC., San Diego, CA (US)

( * ) Notice: Subject to any disclaimer, the term of this patent is extended or adjusted under 35 U.S.C. 154(b) by 0 days.

(21) Appl. No.: 15/153,987

(22) Filed: May 13, 2016

(65) Prior Publication Data

US 2016/0252014 A1    Sep. 1, 2016

Related U.S. Application Data

(63) Continuation of application No. 13/136,938, filed on Aug. 15, 2011, now Pat. No. 9,359,896.

(60) Provisional application No. 61/401,598, filed on Aug. 16, 2010.

(51) Int. Cl.
| | |
|---|---|
| *F01B 7/12* | (2006.01) |
| *F02B 75/32* | (2006.01) |
| *F01B 7/08* | (2006.01) |
| *F02B 23/06* | (2006.01) |
| *F02B 25/08* | (2006.01) |
| *F02B 29/04* | (2006.01) |

(Continued)

(52) U.S. Cl.
CPC ............... *F02B 75/32* (2013.01); *F01B 7/08* (2013.01); *F01B 7/12* (2013.01); *F02B 23/0621* (2013.01); *F02B 23/0624* (2013.01); *F02B 23/0663* (2013.01); *F02B 23/0675* (2013.01); *F02B 25/08* (2013.01); *F02B 29/0406* (2013.01); *F02B 33/38* (2013.01); *F02B 37/04* (2013.01); *F02B 75/04* (2013.01); *F02B 75/282* (2013.01); *F16C 9/04* (2013.01); *F16C 33/08* (2013.01); *F02M 26/08* (2016.02); *Y02T 10/125* (2013.01); *Y10T 74/182* (2015.01)

(58) Field of Classification Search
CPC ............ F01B 7/02; F01B 7/12; F01B 75/28; F01B 7/08; F01B 75/04; F01B 75/282; F01B 75/32; F16C 33/08; F16C 9/04; F02B 25/08

See application file for complete search history.

(56) References Cited

U.S. PATENT DOCUMENTS

| | | | |
|---|---|---|---|
| 2,113,990 A | 4/1938 | Laraque | 123/51 BB |
| 2,237,113 A | 4/1941 | Plumb | 123/51 |

(Continued)

FOREIGN PATENT DOCUMENTS

| | | |
|---|---|---|
| GB | 562635 | 7/1944 |
| GB | 652993 | 5/1951 |

OTHER PUBLICATIONS

*The Commer TS3 Diesel Engine*, Commer Cars Ltd., Publication 566, Sep. 1954, pp. 1-26.

*Primary Examiner* — Jacob Amick
(74) *Attorney, Agent, or Firm* — Terrance A. Meador

(57) ABSTRACT

An opposed-piston engine with a single crankshaft has a rocker-type linkage coupling the crankshaft to the pistons that utilizes a rotatable pivot rocker arm with full-contact plain bearings. A rocker-type linkage utilizes a rotatable pivot bearing with an eccentric aspect to vary translation of piston linkage along the axial direction of a cylinder, which shifts the top dead center (TDC) and bottom dead center (BDC) locations of a piston so as to change the volume of charge air compressed during the power stroke.

5 Claims, 12 Drawing Sheets

(51) Int. Cl.
*F02B 33/38* (2006.01)
*F02B 37/04* (2006.01)
*F02B 75/04* (2006.01)
*F02B 75/28* (2006.01)
*F16C 9/04* (2006.01)
*F16C 33/08* (2006.01)

(56) References Cited

U.S. PATENT DOCUMENTS

| | | | |
|---|---|---|---|
| 2,357,031 A | 8/1944 | Stabler | 123/51 |
| 2,381,465 A | 8/1945 | Schroeder | 123/51 |
| 2,398,640 A * | 4/1946 | Hickey | F01B 7/08 123/41.72 |
| 2,500,823 A | 3/1950 | Hickey | 123/51 R |
| 3,270,730 A | 9/1966 | Timoney | 123/119 |
| 3,633,552 A * | 1/1972 | Huber | F02B 75/047 123/48 B |
| 6,051,751 A | 4/2000 | Sioshansi et al. | 128/898 |
| 2003/0173753 A1 | 9/2003 | Pong | 280/47.27 |
| 2004/0094113 A1 | 5/2004 | Honda et al. | 123/196 R |
| 2009/0283067 A1 | 11/2009 | Kurihara et al. | 123/196 A |
| 2010/0132672 A1 | 6/2010 | Lee et al. | 123/48 B |
| 2012/0073526 A1 | 3/2012 | Dion et al. | 123/41.44 |
| 2012/0112357 A1 | 5/2012 | Zhang | 257/774 |

\* cited by examiner

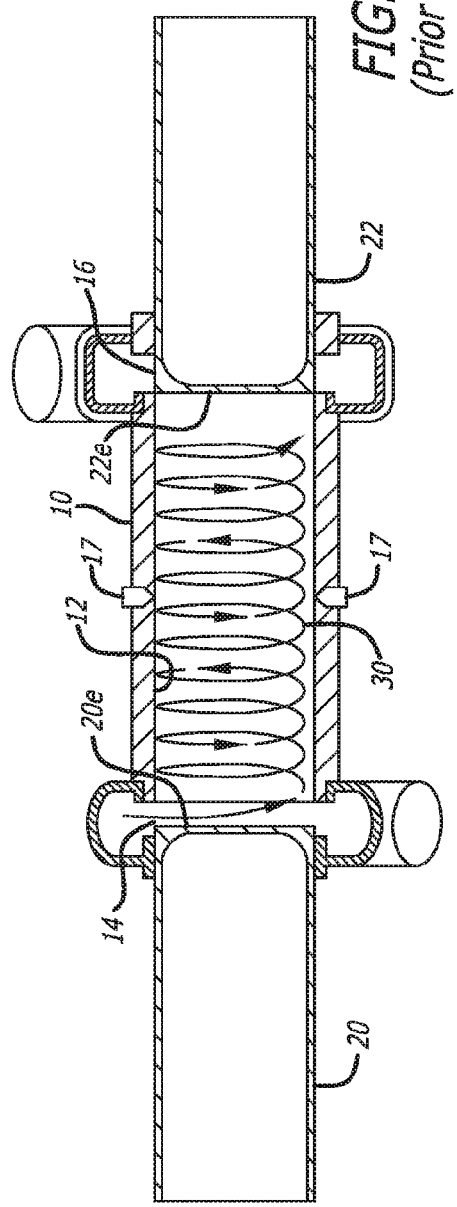
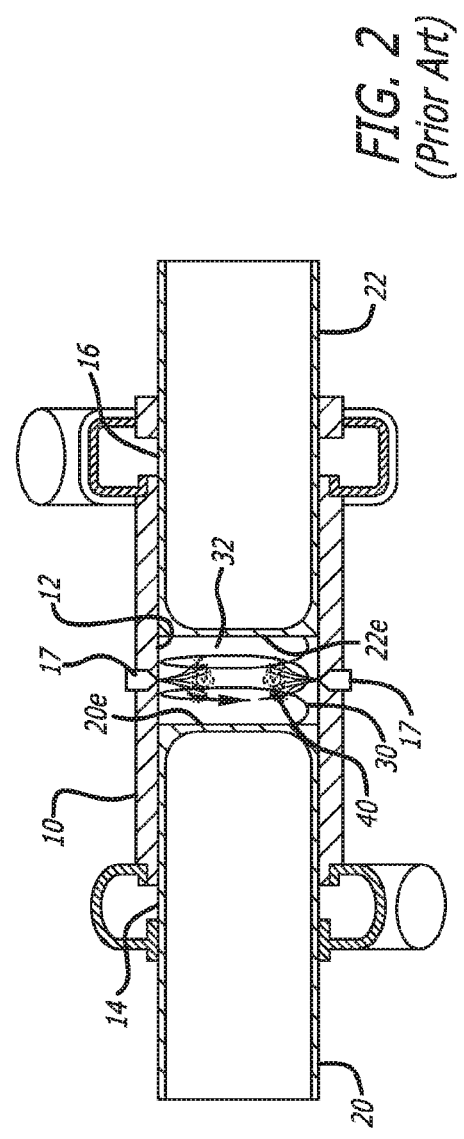

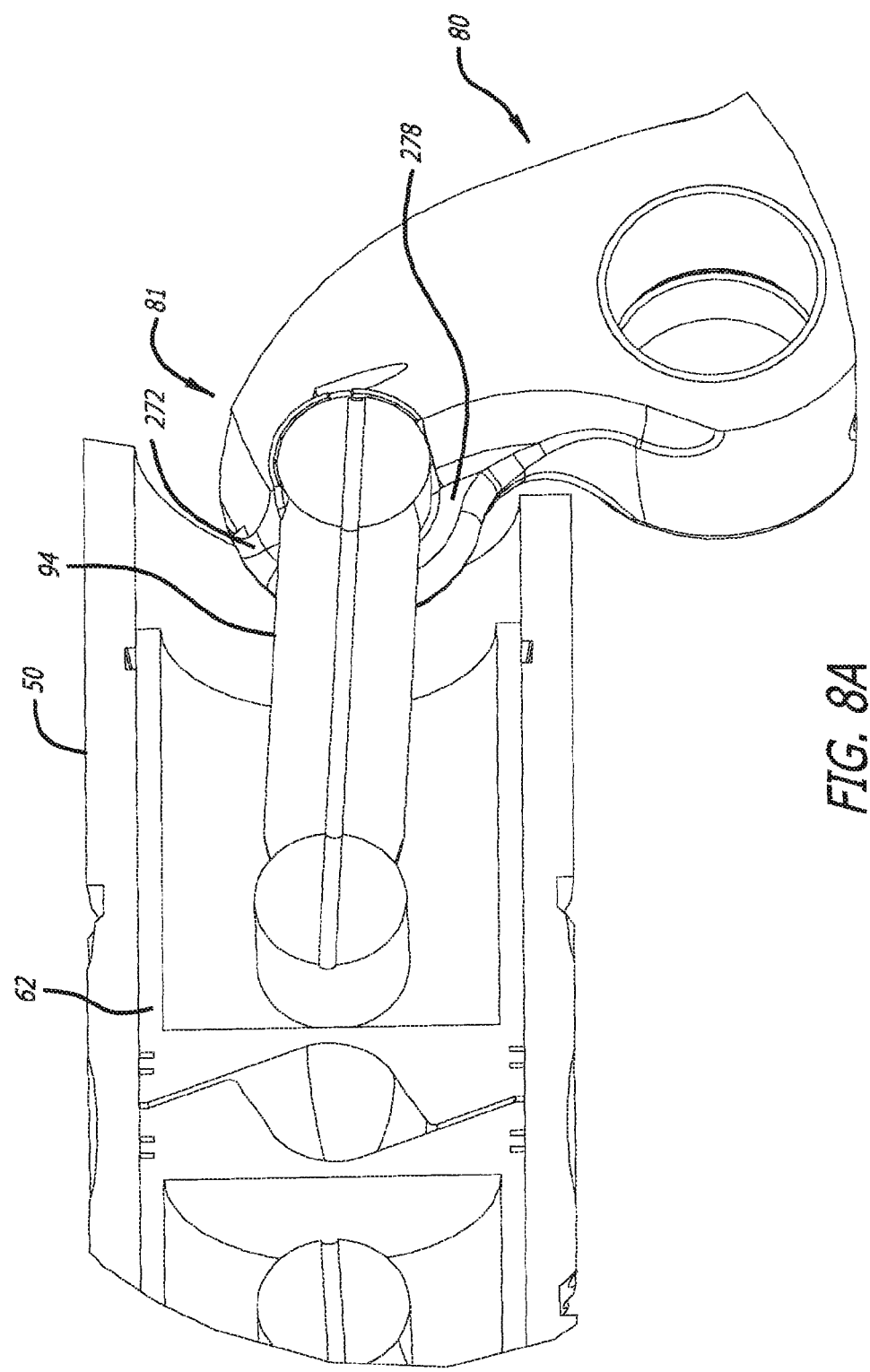

OPPOSED-PISTON ENGINE HAVING A SINGLE CRANKSHAFT COUPLED TO THE OPPOSED PISTONS BY LINKAGES WITH PIVOTED ROCKER ARMS

RELATED APPLICATIONS AND PRIORITY

This application is a continuation of U.S. patent application Ser. No. 13/136,938, filed Aug. 15, 2011, which claims priority to US provisional application for patent 61/401,598, filed Aug. 16, 2010.

FIELD

The field is internal combustion engines. Particularly, the field relates to two-stroke engines with ported cylinders; in more particular applications, the field relates to a ported, opposed-piston engine with a single crankshaft that is coupled to the opposed pistons by linkages with pivoted rocker arms.

BACKGROUND

Per FIG. 1, an opposed-piston engine includes at least one cylinder 10 with a bore 12 and longitudinally-displaced intake and exhaust ports 14 and 16 machined or formed therein. One or more fuel injectors 17 are secured in injector ports (ports where injectors are positioned) that open through the side surface of the cylinder. Two pistons 20, 22 according to the prior art are disposed in the bore 12 with their end surfaces 20e, 22e in opposition to each other. For convenience, the piston 20 is denominated as the "intake" piston because of its proximity to the intake port 14. Similarly, the piston 22 is denominated as the "exhaust" piston because of its proximity to the exhaust port 16.

Operation of an opposed-piston engine with one or more ported cylinders (cylinders with one or more of intake and exhaust ports formed therein) such as the cylinder 10 is well understood. In this regard, in response to combustion the opposed pistons move away from respective top dead center (TDC) positions where they are at their innermost positions in the cylinder 10. While moving from TDC, the pistons keep their associated ports closed until they approach respective bottom dead center (BDC) positions where they are at their outermost positions in the cylinder. The pistons may move in phase so that the intake and exhaust ports 14, 16 open and close in unison. Alternatively, one piston may lead the other in phase, in which case the intake and exhaust ports have different opening and closing times.

In many opposed piston constructions, a phase offset is introduced into the piston movements. For example, the exhaust piston leads the intake piston and the phase offset causes the pistons to move around their BDC positions in a sequence in which the exhaust port 16 opens as the exhaust piston 22 moves through BDC while the intake port 14 is still closed so that combustion gasses start to flow out of the exhaust port 16. Then as the pistons continue moving away from each other, the intake piston 20 moves through BDC, causing the intake port 14 to open while the exhaust port 16 is still open. A charge of pressurized air is forced into the cylinder 10 through the open intake port 14, driving exhaust gasses out of the cylinder through the exhaust port 16. As seen in FIG. 1, after further movement of the pistons, the exhaust port 16 closes before the intake port 14 while the intake piston 20 continues to move away from BDC. Typically, the charge of fresh air is swirled as it passes through ramped openings of the intake port 14. With reference to FIG. 1, the swirling motion (or simply, "swirl") 30 is a generally helical movement of charge air that circulates around the cylinder's longitudinal axis and moves longitudinally through the bore of the cylinder 10. Per FIG. 2, as the pistons 20, 22 continue moving toward TDC, the intake port 14 is closed and the swirling charge air remaining in the cylinder is compressed between the end surfaces 20e and 22e. As the pistons near their respective TDC locations in the cylinder bore, fuel 40 is injected into the compressed charge air 30, between the end surfaces 20e, 22e of the pistons. As injection continues, the swirling mixture of air and fuel is increasingly compressed in a combustion chamber 32 defined between the end surfaces 20e and 22e as the pistons 20 and 22 move through their respective TDC locations. When the mixture reaches an ignition temperature, the fuel ignites in the combustion chamber, driving the pistons apart toward their respective BDC locations.

As illustrated in FIG. 2, fuel is directly injected through the side of the cylinder ("direct side injection") into the cylinder bore and the movement of the fuel interacts with the residual swirling motion of the charge air in the bore.

In some aspects of two-stroke, opposed-piston construction, the nature of the operating cycle results in the uninterrupted application of compressive loads on bearings in the piston-to-crankshaft connecting linkages. These non-reversing loads prevent the separation of bearing surfaces, which blocks the flow of lubricant therebetween and limits the durability of such bearings. For example, opposed-piston engines with single-crankshaft constructions include linkages with pivoted rocker arms. In these constructions, a rocker arm pivots by means of a hinge-type plain bearing that fails quickly under non-reversing high compressive loads generated by combustion.

In some aspects of opposed-piston engines, a variable compression ratio (VCR) system is provided to increase fuel efficiency by dynamically changing the compression ratio in order to optimize it under varying load conditions. A high compression ratio generally improves engine operating efficiency but is limited by the high structural loads that result at high power conditions. A VCR system allows the advantages of high compression ratio where appropriate while allowing low compression ratio where needed. VCR is implemented by changing the combustion chamber volume at or near TDC of the pistons. In one example described in U.S. Pat. No. 2,357,031, an opposed-piston engine with single-crankshaft construction that includes linkages with pivoted rocker-arms, a VCR system changes the pivot points of rocker arms by eccentric elements that are fixed on rotatable pivot shafts. When a pivot shaft is rotated to change the pivot point, each piston rod and the piston attached to the piston rod are moved, which moves the TDC and BDC points of the piston. When the TDC point is changed, the combustion chamber space between the piston and its opposing mate changes accordingly. However, the VCR mechanism described in this patent utilizes a complex, manually-actuated construction that does not respond automatically to changing engine conditions.

SUMMARY OF THE INVENTION

An object is to a provide rocker arm bearing construction that alleviates the lubricant-blocking effects of non-reversing loads and increases the durability of the bearings. Preferably, a full contact rocker arm bearing distributes compressive loads generated by combustion across the entire face of a pivot pin.

Another object is to provide a VCR system for a single-crankshaft opposed piston engine with a rocker-type linkage that utilizes a rotatable pivot bearing with an eccentric aspect in a simple and compact VCR system construction in which the pivot shaft is stationary. Preferably, the VCR system is actuated by a computer-controlled mechanism so as to respond automatically to changing engine conditions.

BRIEF DESCRIPTION OF THE DRAWINGS

FIG. 1 is a side sectional partially schematic drawing of a cylinder of a prior art opposed-piston engine with opposed pistons near respective bottom dead center locations, and is appropriately labeled "Prior Art".

FIG. 2 is a side sectional partially schematic drawing of the cylinder of FIG. 1 with the opposed pistons near respective top dead center locations where end surfaces of the pistons define a combustion chamber, and is appropriately labeled "Prior Art".

FIGS. 8A and 8B are enlarged, perspective, sectional views of a rocker arm bearing coupling a piston to a rocker arm at top dead center (TDC) and bottom dead center (BDC) of the piston, respectively.

DETAILED DESCRIPTION OF THE PREFERRED EMBODIMENTS

The invention described in this specification is presented in an explanatory context that includes a ported, uniflow scavenging engine having at least one cylinder in which a pair of pistons is disposed with their end surfaces in opposition. This explanatory context is intended to provide a basis for understanding various embodiments of the invention by way of illustrative examples that are not meant to prevent application of the invention to other internal combustion constructions.

Figure 3:
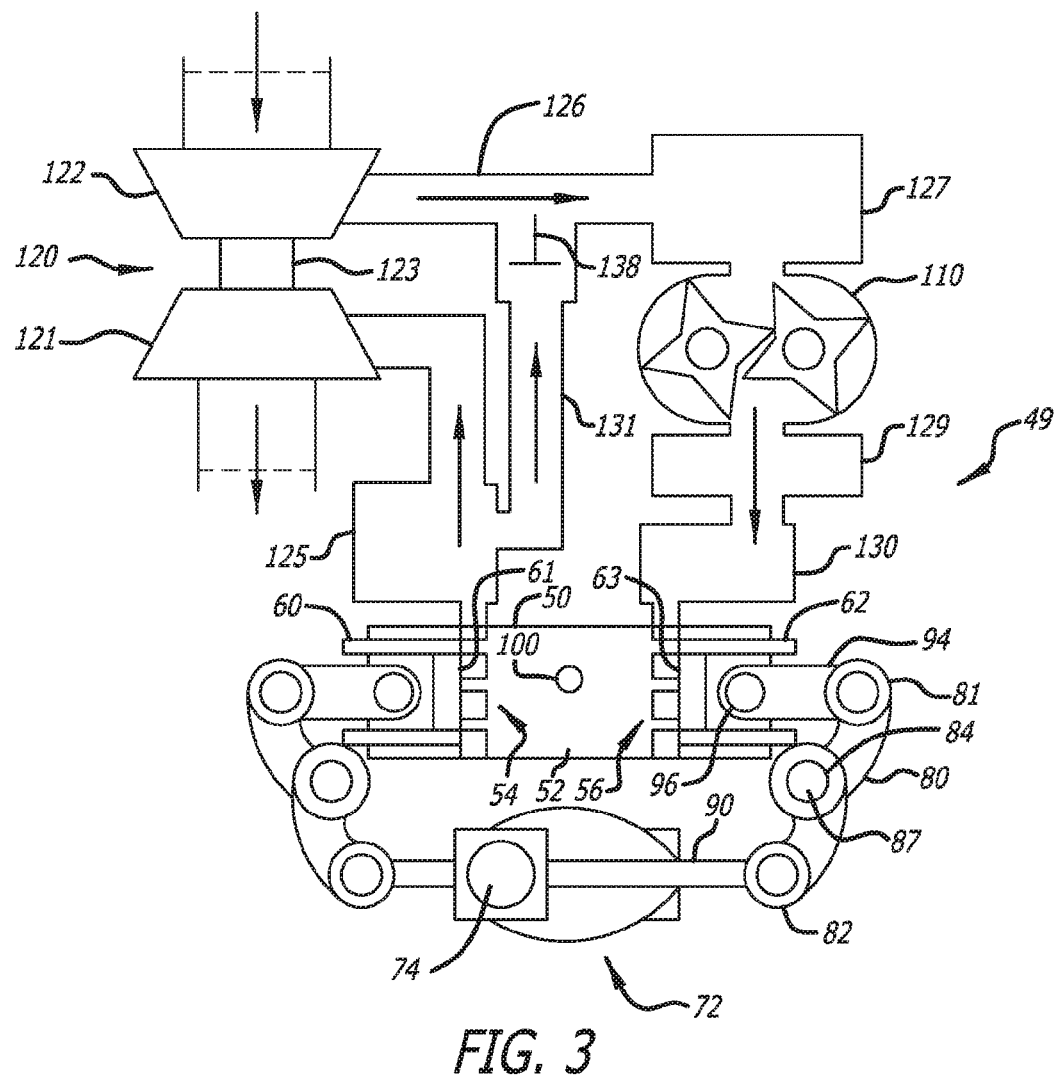
FIG. 3 is a conceptual schematic diagram of an internal combustion engine in which aspects of the invention are illustrated.

In FIG. 3, an internal combustion engine 49 is embodied by an opposed-piston engine having at least one cylinder 50. For example, the engine may have two cylinders, three cylinders, or four or more cylinders. Each cylinder 50 has a bore 52 and exhaust and intake ports 54 and 56 formed or machined in respective ends thereof. The exhaust and intake ports 54 and 56 each include a circumferential ring of openings in which adjacent openings are separated by a solid bridge. (In some descriptions, each opening is referred to as a "port"; however, the construction of a circumferential sequence of such "ports" is no different than the port constructions shown in FIG. 3.) Exhaust and intake pistons 60 and 62 are slidably disposed in the bore 52 with their end surfaces 61 and 63 opposing one another. When the pistons 60 and 62 are at or near their TDC positions, combustion takes place in a combustion chamber in the bore 52, defined between the end surfaces 61 and 63. The engine includes a drive train assembly having at least one crankshaft 72 with crankpins 74.

As seen in FIG. 3, each piston of the opposed pistons 60 and 62 is connected to a respective crankpin 74 by a respective rocker arm assembly. Each rocker arm assembly has a rocker arm 80, a connecting rod 90, and a piston rod 94. Each rocker arm 80 has longitudinally spaced-apart ends 81 and 82 and a pivot bearing seat 84 between those ends where it pivots on a pivot shaft 87. Each connecting rod 90 is connected at one end to a crankpin 74, and to the end 82 of a rocker arm 80 at its opposite end. Each piston rod 94 is connected at one end to a wristpin 96 internal to a piston, and to the end 81 of a rocker arm 80 at its opposite end.

In the engine of FIG. 3, fuel is injected directly into the bore 52, between the piston end surfaces 61 and 63, through at least one fuel injector nozzle 100 positioned in an opening through the side of the cylinder 50.

With further reference to FIG. 3, an air charge system manages charge air provided to, and exhaust gas produced by, the engine 49. A representative air charge system construction includes a charge air source that compresses fresh air and a charge air channel through which charge air is transported to the at least one intake port of the engine. At least one charge air cooler in the charge air channel is coupled to receive and cool the charge air before delivery to the intake port or ports of the engine.

With reference to FIG. 3, a supercharger 110 is coupled by a belt linkage to a crankshaft so as to be driven thereby. The supercharger 110 can be a single-speed or multiple-speed device or a fully variable-speed device. A turbo-charger 120 includes a turbine 121 and a compressor 122 which rotate on a common shaft 123. The turbo-charger 120 can be a single-geometry or a variable-geometry device. The turbo-charger 120 extracts energy from exhaust gas that exits the exhaust ports 54 and flows into a conduit 124 from an exhaust manifold 125. In this regard, the turbine 121 is rotated by exhaust gas passing through it. This rotates the compressor 122, causing it to compress fresh air. The charge air output by the compressor 122 flows through a conduit 126 to a charge air cooler 127, and from there to the supercharger 110 where it is further compressed. Air compressed by the supercharger 110 is output from the supercharger through a charge air cooler 129 to an intake manifold 130. One or more intake ports 56 receive a charge of fresh air pressurized by the supercharger 110 through the intake manifold 130. Preferably, but not necessarily, in multi-cylinder opposed-piston engines, the intake manifold 130 is constituted of an intake plenum that communicates with the intake ports 56 of all cylinders 50.

Figure 4:
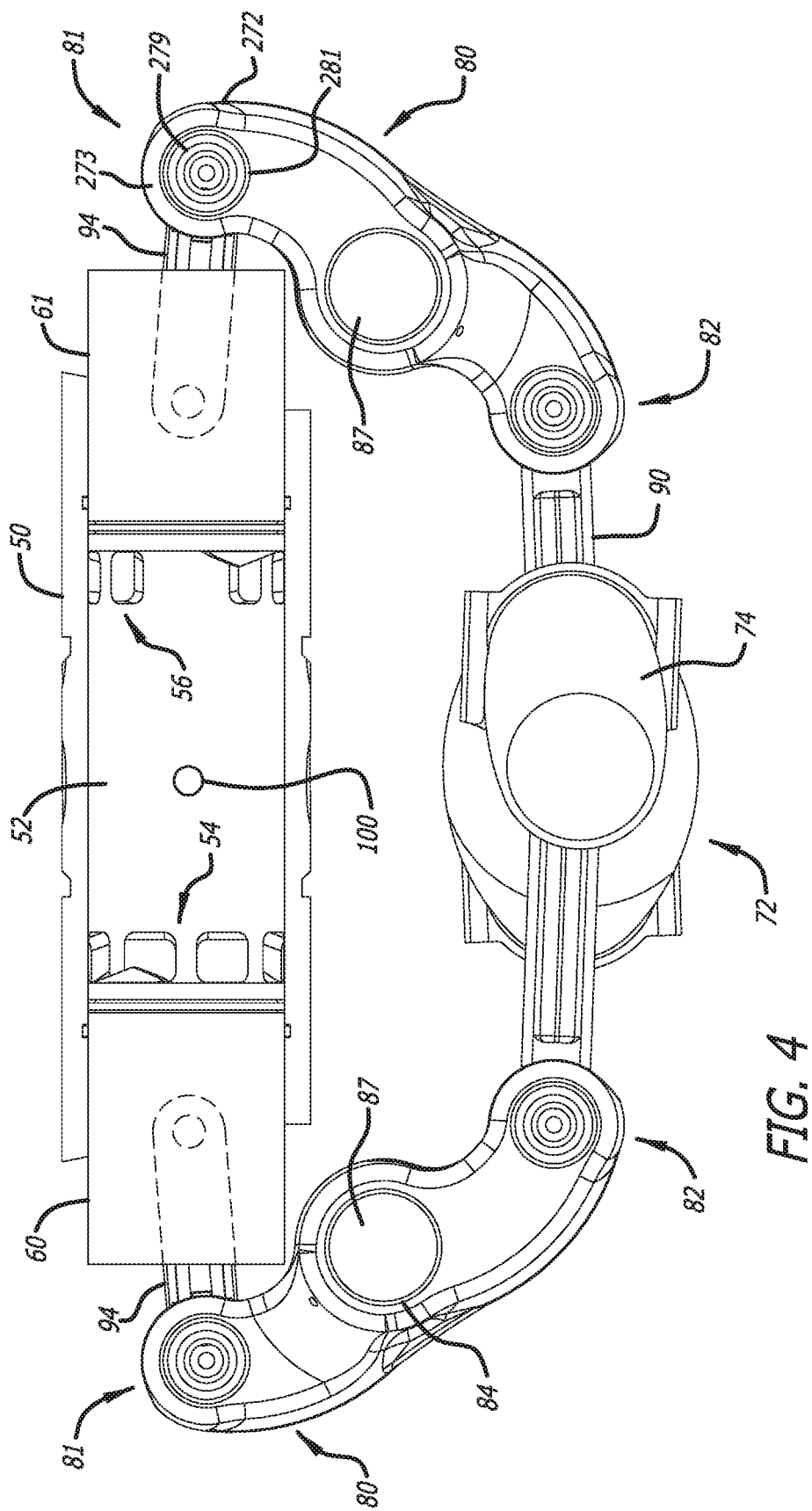
FIG. 4 is an enlarged view of a portion of the internal combustion engine of FIG. 3.

Rocker Arm Construction:

FIG. 4 is an enlarged sectional view showing the cylinder, pistons, rocker arm linkage, and crankshaft of FIG. 3. The rocker arms 80 shown in FIG. 4 allow for an opposed-piston engine construction with one crankshaft. For some opposed-piston applications, a single-crankshaft construction is preferable to a dual crankshaft construction in terms of power/weight ratio and size. However, previous approaches to opposed-piston, single-crankshaft constructions did not achieve the full power/weight potential, for several reasons.

During operation of a two-stroke, opposed-piston engine, the forces applied to the rocker arms can be large. Moreover, the forces in the crank train do not completely reverse direction as they do in a four stroke engine. This inhibits replenishment of the oil film in the plain bearings of the rocker arms, which, in turn limits the allowable loading that the rocker arms can bear. And so, the engine cannot be operated at high loads, and thus cannot achieve the full power/weight ratio of which it is otherwise capable. Accordingly, in a two-stroke, opposed-piston engine construction with a rocker arm linkage, it is desirable to increase the loads that the rocker arm bearings are capable of supporting. An increased force loading capability in the rocker arms leads to an increase in power/weight ratio over low-load bearing constructions.

Conventional rocker arm bearings that coupled rocker arm upper and lower ends to piston and connecting rods were constituted of a narrow ring on the rocker arm end, a forked rod end with two spaced-apart rings between which the ring of a rocker arm end fit, and a cylindrical pivot pin that extended through all three rings. This bearing construction is called a "hinge-type" pin joint because it resembles a door hinge mechanism. While a hinge-type pin joint affords a great degree of rotational freedom, it also concentrates the crank train forces at the ring/pin contact areas, which limits the loads that can be borne by the bearing. Accordingly, it is desirable to increase the contact area of the rocker arm bearings in order to increase the magnitude of the loads borne by those bearings.

Figure 5:
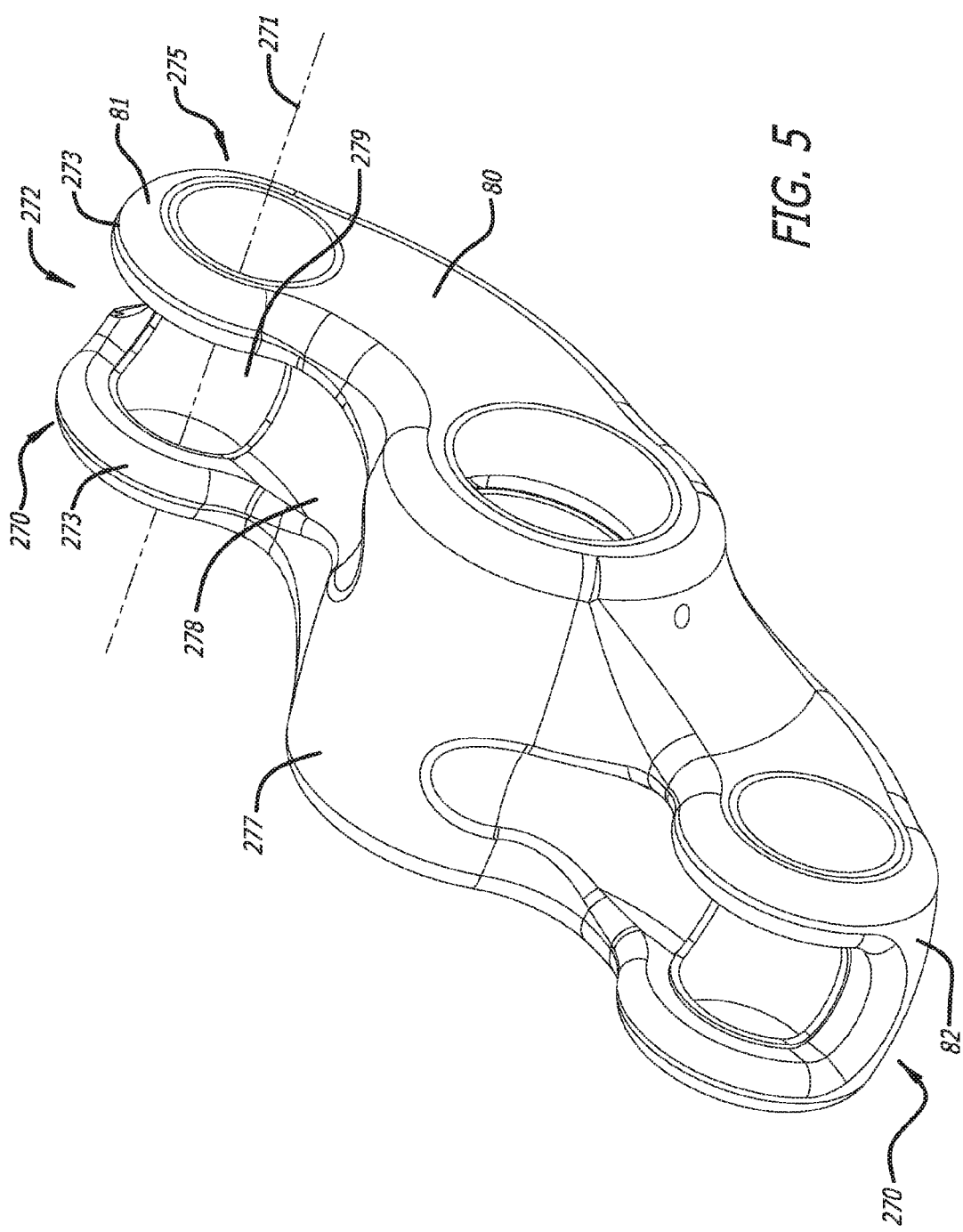
FIG. 5 is a perspective view of a rocker arm construction in the connecting linkage of the internal combustion engine of FIG. 3.
Figure 6:
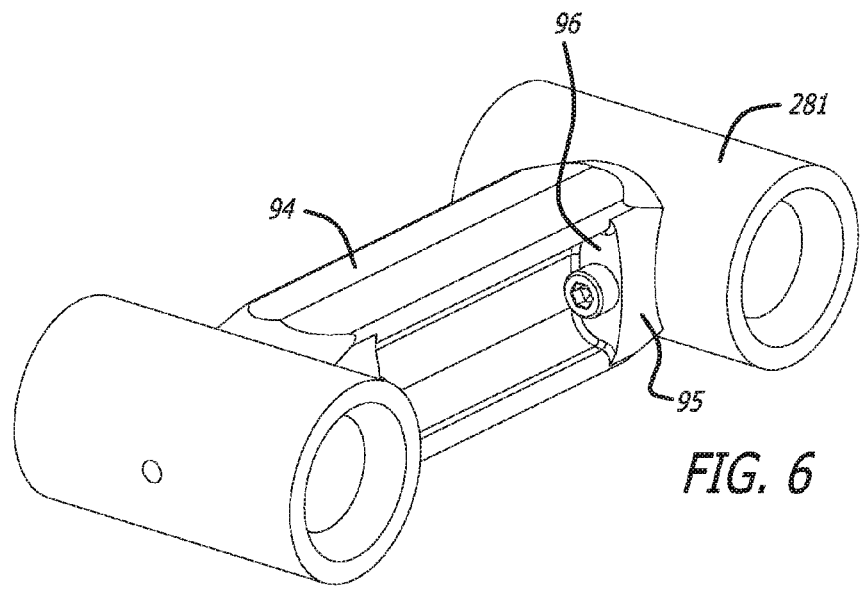
FIG. 6 is a perspective view of a piston rod.
Figure 7:
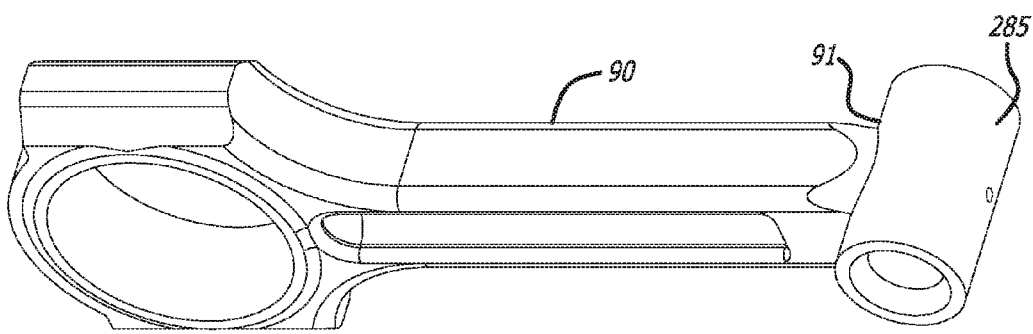
FIG. 7 is a perspective view of a connecting rod.

A rocker arm bearing capable of distributing compressive loads generated by combustion across the entire face of the pivot pin allows for much more bearing area and, hence, lower unit loading compared to a typical hinge type pin joint. Referring now to FIGS. 4 and 5, the rocker arm 80 has an elongate extent between the ends 81 and 82. A cylindrical bearing seat 270 is formed in the upper end 81. The bearing seat 270 has a substantially cylindrical shape with a rotation axis 271 that is substantially perpendicular to the elongate extent of the rocker arm. The bearing seat includes a central half-cylindrical cutout 272 that forms a gap between two rings 273 that are joined by a continuous half-cylindrical portion 275. The cutout 272 lies on one side 277 of the rocker arm 80 and engages an end of piston rod 94. An elongate trough 278 runs in the side 277 from the cutout 272 toward the center of the rocker arm 80. A bushing 279 having substantially the same shape as the bearing seat 270 is seated in the bearing seat. As shown in FIG. 6, the piston rod end 95 that faces the bearing seat 270 has a concave face that fits to the cylindrical surface of a bearing pin 281. The piston rod end 95 is bolted to the bearing pin 281 on the cylindrical surface of the bearing pin, midway between the ends of the bearing pin, through flanges 96 formed in recesses on opposing sides of the piston rod 94. The bearing pin 281 is received in the bushing 279 shown in FIG. 5, with the piston rod extending through the cutout 272. During combustion, the bearing interface between the half-cylindrical inside surface of the bushing 279 and the bearing pin 281 takes the load generated thereby, and distributes the load across the full face of the bearing pin 281. This bearing interface distributes the load over a larger area of the bearing pin 281 than is the case with a hinge-type pin joint. The bearing construction of the lower end 82 of the rocker arm 80 is identical to that of the upper end. As seen in FIG. 7, the end 91 of the connecting rod 90 is constructed to receive a bearing pin 285 in the same manner as the piston end 95 seen in FIG. 6. As per FIGS. 4, 5, and 7, the lower end 82 of the rocker arm 80 includes a bearing seat 290 that receives the connecting rod bearing pin 285, which affords the lower end bearing coupling the connecting rod with the rocker arm the same advantages as the upper end bearing coupling the piston rod and rocker arm.

Figure 8B:
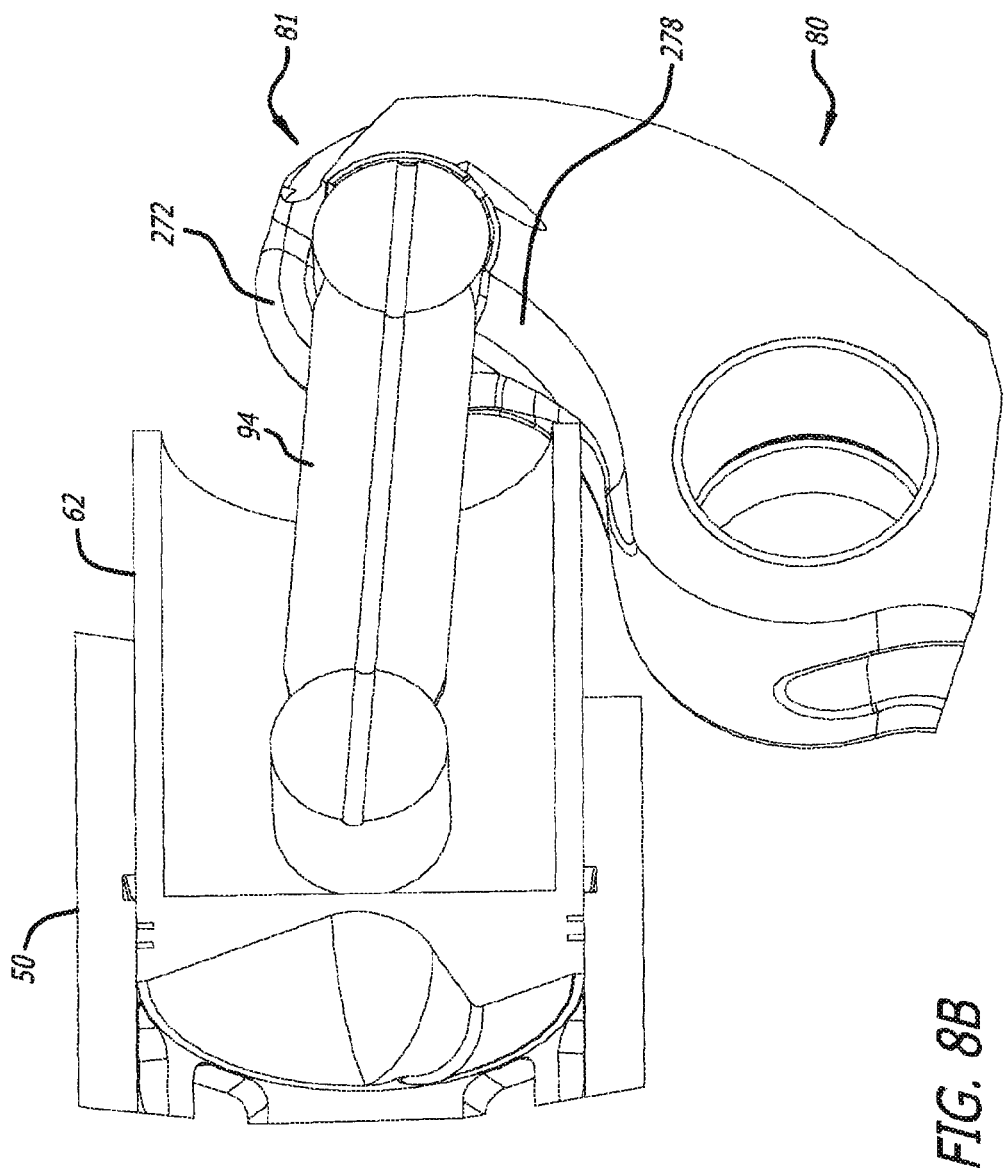

Each rocker arm must be able to pivot freely across a range of angles from TDC to BDC of the pistons. As shown in FIGS. 4, 8A, and 8B, the cutout 272 and the trough 278 are large enough to provide clearance between the rocker arm 80 and piston rod 94 at and between both extremes of piston movement. Similarly, the cutout and trough at the lower end 82 provide the same clearance between the rocker arm 80 and connecting rod 94 during rotation of the crankshaft.

With reference to FIG. 4, lubrication of the bushings in the rocker arm pivot bearing seats 84 is provided by oil transported through channels (not shown) drilled in the rocker pivot shafts 87. The end bushings 279 can be provided with annular grooves to distribute the oil. Channels (not shown) can be drilled in the rocker arms 80 to transport oil from the rocker pivot bushings to the bushings 279 in the bearings of the upper and lower ends of the rocker arms.

Variable Compression Ratio:

In this invention, a VCR system for an opposed-piston engine operates electro-mechanically. In some aspects, the VCR system is automatically operated under control of an ECU so as to vary the compression ratio of one or more cylinders in response to engine operating conditions. The variation is preferably implemented by translation of piston linkage along the axial direction of a cylinder, which shifts the TDC and BDC locations of a piston and therefore increases or decreases the volume of charge air compressed during the power stroke. In an opposed-piston engine, the ability to vary the volume trapped in a cylinder between the pistons in a cylinder is realized by translation of either or both of the exhaust and intake piston linkages.

In a preferred embodiment illustrated in a rocker-style opposed-piston engine, a pivot bearing with an eccentric aspect is provided in one or more rocker arms of the engine. Rotation of the pivot bearing moves the pivot point of the rocker arm. The movement of the rocker arm pivot point causes a corresponding translation of piston linkage coupled to the rocker arm. A preferred eccentric pivot sleeve construction affords a simple, very compact VCR mechanism.

Figure 9:
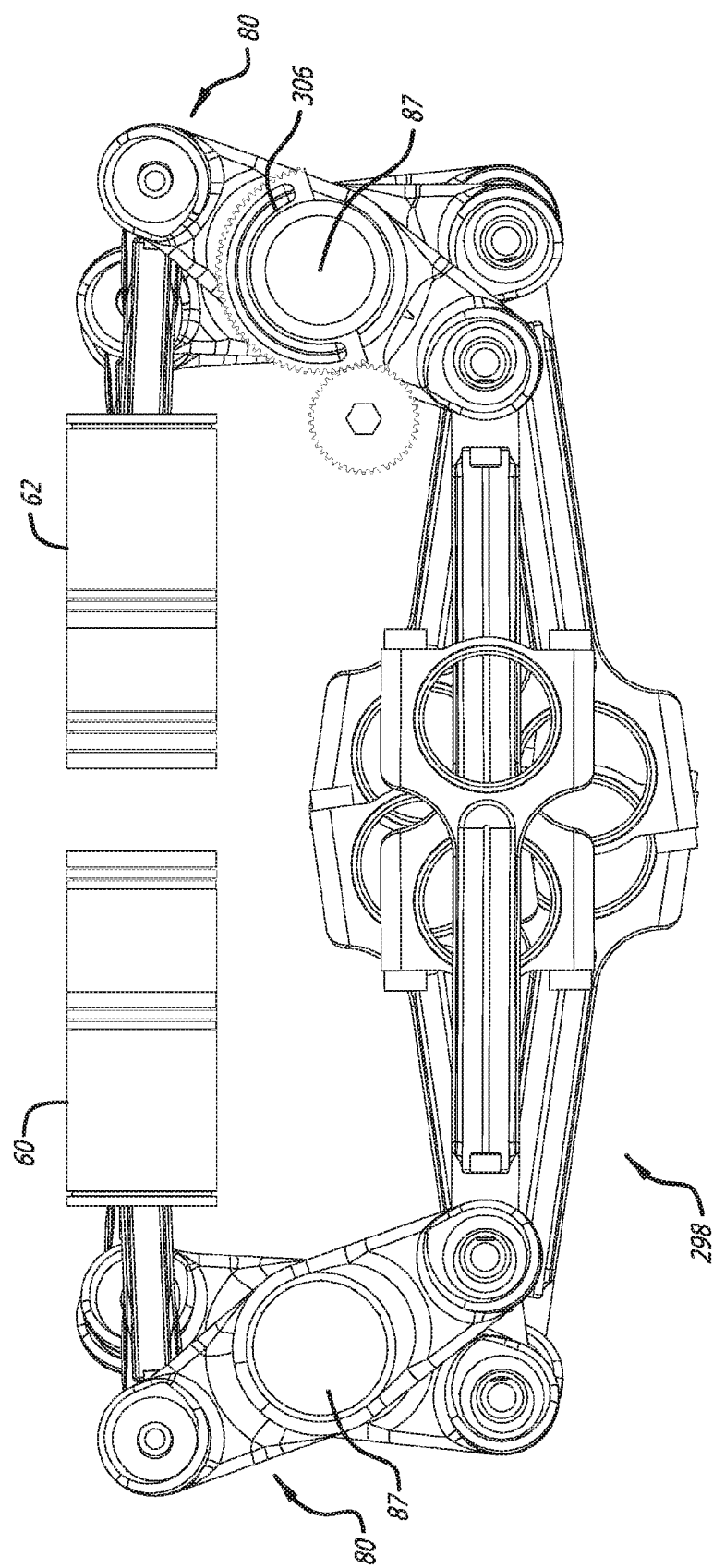
FIG. 9 is an explanatory diagram showing elements of a variable compression ratio (VCR) system in a rocker-style opposed-piston engine.
Figure 10:
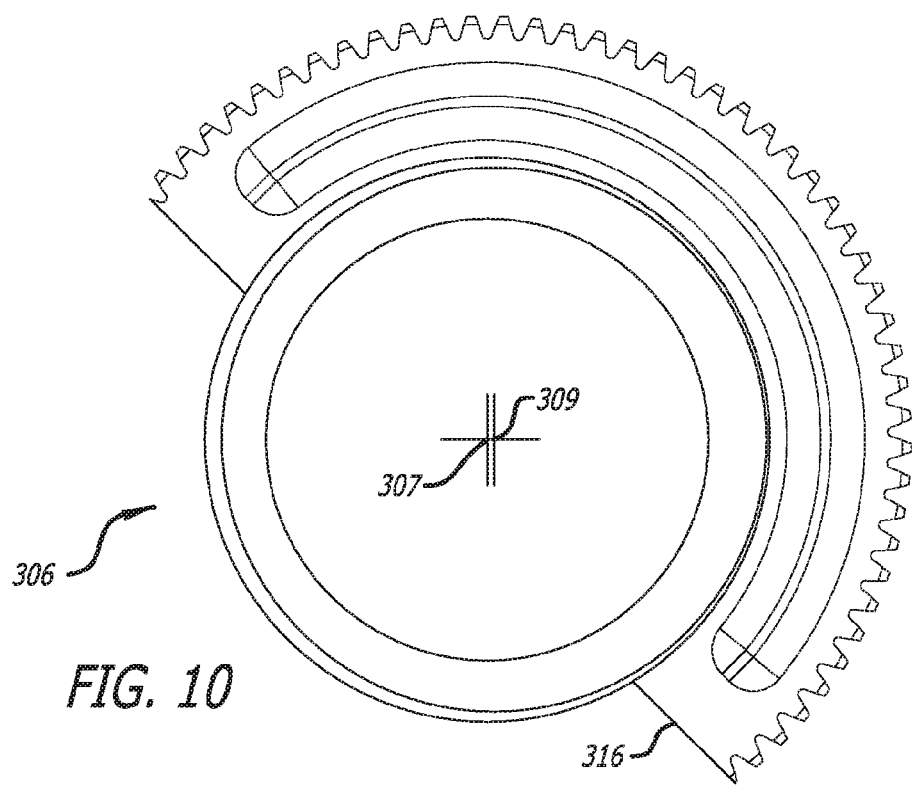
FIG. 10 is an end view of a pivot bearing with an eccentric aspect that fits on a pivot shaft.

With reference to FIG. 9, the rocker arms 80 of the rocker-style opposed-piston engine 298 pivot on fixed pivot shafts 87 located on opposite sides of the engine. These pivot shafts receive approximately twice the firing pressure of the engine and hence, are very highly loaded. When VCR has been added to rocker style engines in the past, these highly loaded pivot shafts were typically supported in bearings and allowed to rotate. However, in the embodiment shown in FIG. 9, the pivot shafts 87 are fixed in position. At each rocker arm location along the pivot shaft 87 a pivot bearing with an eccentric aspect is provided. Each pivot bearing is constituted of an eccentric sleeve 306 that fits around a pivot shaft 87. The eccentric sleeve 306, illustrated in FIGS. 10 and 11, has an outer diameter (OD) with a center axis 307 and an inner diameter (ID) with a center axis 309. The two axes 307 and 309 are offset from each other by a distance that defines the eccentric aspect of sleeve 306. The eccentric sleeve 306 is a bearing on both its inner and outer surfaces 310 and 312. As per FIGS. 11 and 14, the inner surface 310 moves on a fixed pivot shaft 87 and the outer surface 312 contacts a pivot bearing seat 84. The eccentric sleeves 306, which pass the engine firing pressures to the pivot shafts 87 via compression, can be relatively thin. According to this embodiment, each rocker arm 80 has its own eccentric sleeve 306. As per FIGS. 9 and 12, eccentric sleeves 306 are used only with the rocker arms 80 of intake-side pistons 62; however they can be used on both intake rocker arms and exhaust rocker arms, or they can be used on exhaust rocker arms alone.

Figure 12:
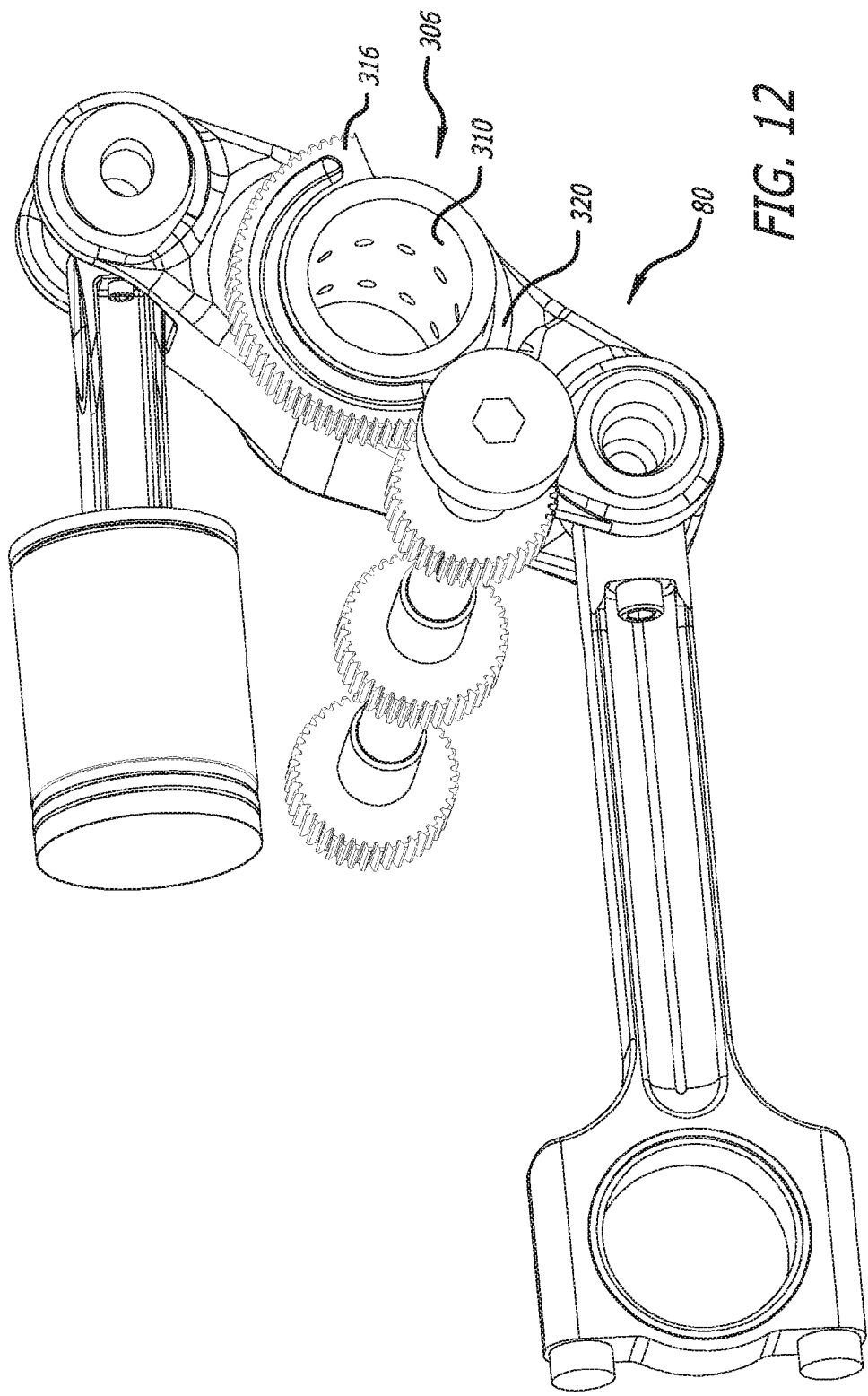
FIG. 12 is an explanatory diagram showing a pivot bearing with an eccentric aspect in a rocker-style linkage.
Figure 13:
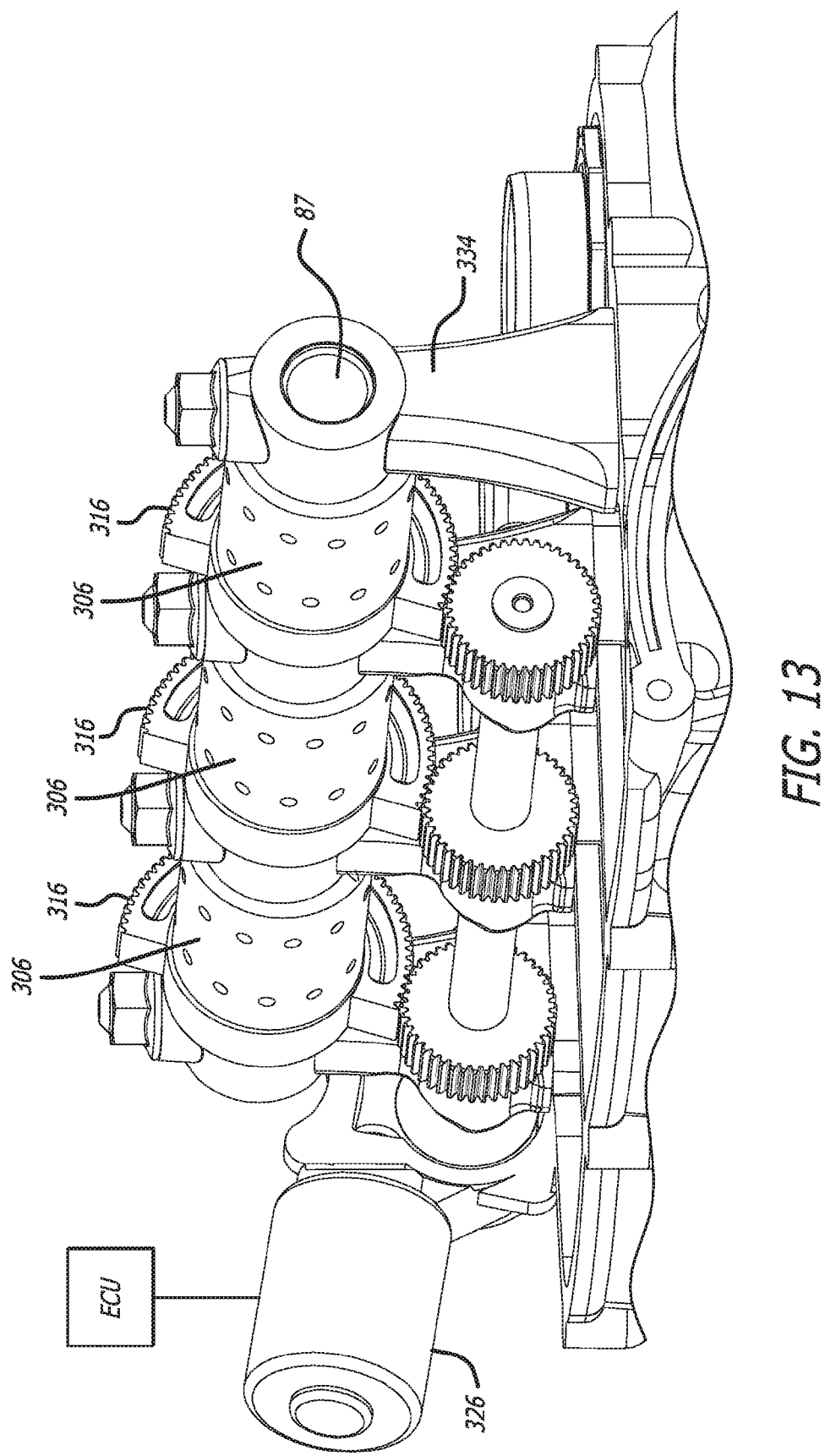
FIG. 13 is an explanatory diagram showing a VCR system for an opposed-piston engine.

With reference to FIGS. 12 and 13, the compression ratio of the engine is varied by rotating the eccentric sleeves 306. A pivot bearing actuator engages an eccentric sleeve to vary its rotational position on the pivot shaft. Varying the rotational position of the eccentric sleeve changes the pivot axis of the corresponding rocker arm which alters the compression ratio of the corresponding cylinder. Actuation is accomplished by provision of a ring gear flange 316 mounted or formed at one end of each eccentric sleeve 306. In other words, each eccentric sleeve 306 has its own ring gear flange 316. In order to vary the rotational positions of the eccentric sleeves 306 on one side of the engine, a rotatable control shaft 320 with multiple drive gears 322 is used. Each drive gear 322 is positioned to engage the ring gear flange 316 of a respective eccentric sleeve 306 and to rotate the sleeve on its pivot shaft 87. This provides for setting the same compression ratio in all cylinders with a single actuator constructed to rotate the control shaft 320. For example the actuator can be constituted of a motorized worm drive assembly 326 that is automatically operated under control of, and by, a computerized engine control unit (ECU) 49 in response to engine operating conditions. Such engine operating conditions include engine speed, acceleration, and load. Analysis indicates that, with an offset of 1 mm in the axes of the eccentric sleeve, rotation of the eccentric sleeve 306 by 180° between maximum and minimum positions can provide compression ratio variation from 21/1 to 14/1.

The control shaft 320 can be mounted outboard or inboard of the fixed pivot shaft 87; one advantage of placing the control shaft 320 inboard is that it does not increase the width of the engine.

Figure 11:
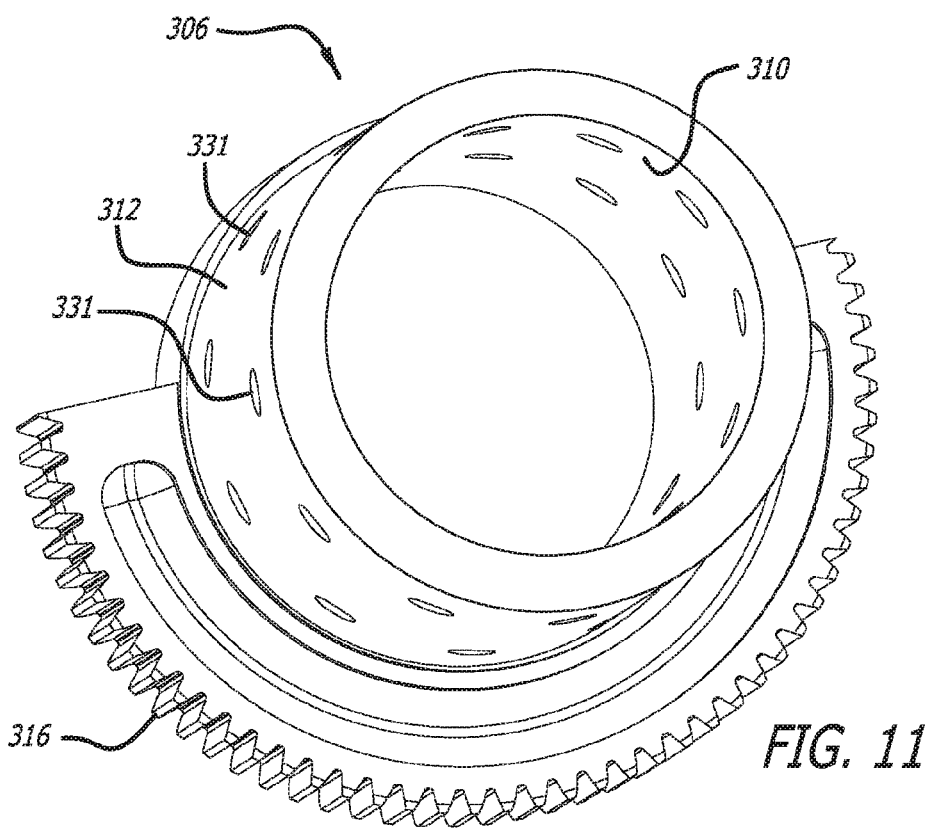
FIG. 11 is a perspective view of the pivot bearing of FIG. 10.
Figure 14:
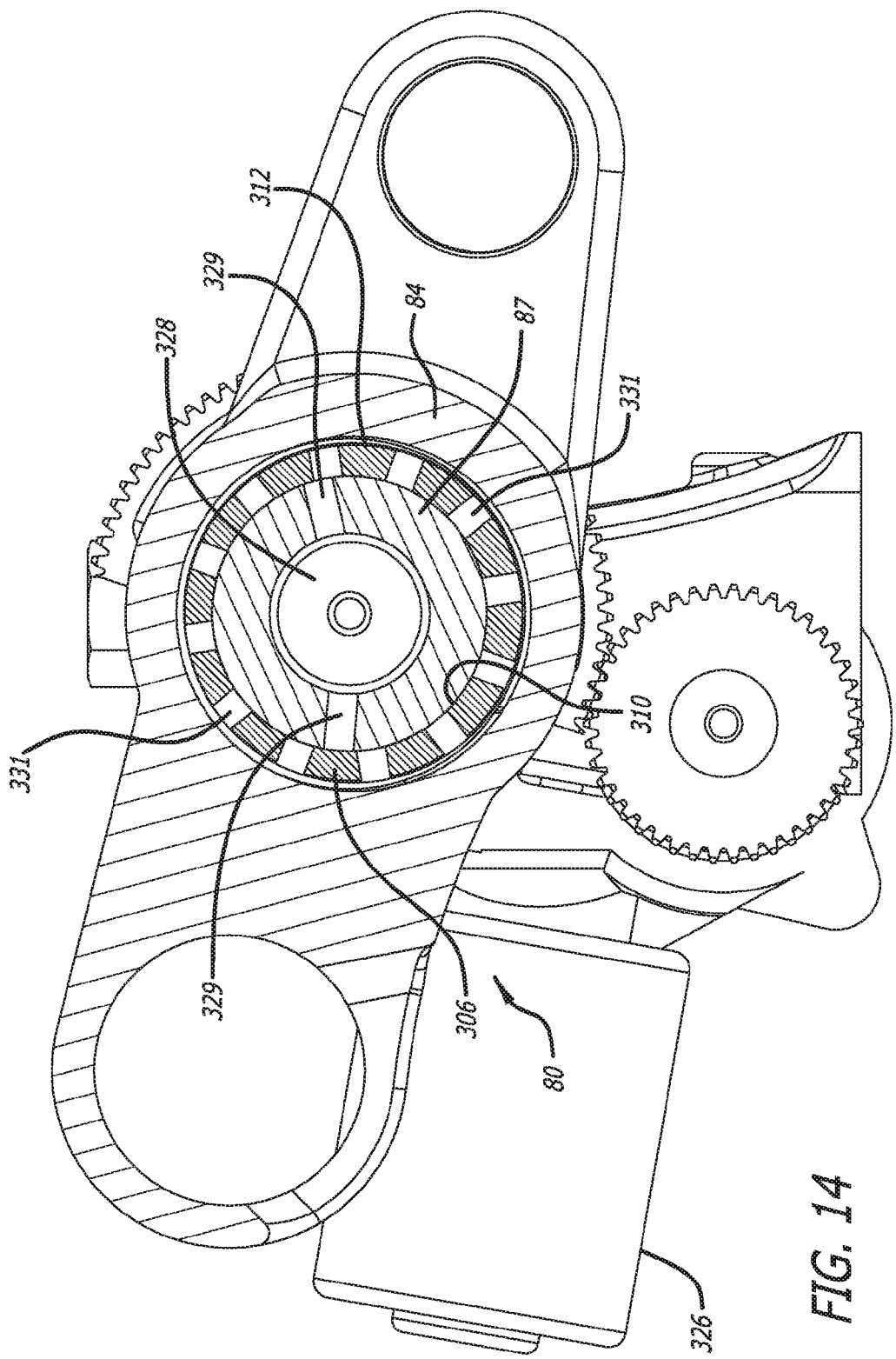
FIG. 14 is an explanatory drawing showing how the pivot bearing of FIG. 12 is lubricated.

An embodiment for lubricating the bearing surfaces of an eccentric sleeve is illustrated in FIGS. 11 and 14. An elongate gallery 328 in each pivot shaft 87 extends in an axial direction of the pivot shaft. At each rocker arm location, one or more sets of radial holes 329 extend in an annular direction in the pivot shaft 87. Preferably, two sets or radial holes 329 are provided. Each radial hole 329 extends from the gallery 328 to the side surface of the pivot shaft 87. As best seen in FIGS. 11 and 14, one or more sets of radial holes 331 extend in an annular direction in each pivot bearing. Preferably, two sets of radial holes 331 are provided. The numbers of radial holes 329 and 331, and the pitches between the holes, are chosen such that at any position to which the radial bearing is rotated, at least one hole 331 in each pivot bearing overlaps at least one hole 329 at the corresponding pivot location in the pivot shaft 87. Each pivot shaft 87 is closed at both ends, and lubricating oil is supplied under pressure, for example from galleries in the bearing rod support pedestals 334 seen in FIG. 13 through drilled holes (not shown) in the pivot shaft 87.

Although the invention has been described with reference to a ported opposed engine construction with a single crankshaft, it should be understood that various aspects of the invention can be applied to opposed-piston engines with two crankshafts and to opposed-piton engines with three crankshafts, without departing from the spirit of the invention. Moreover, various aspects of the invention can be applied to opposed-piston engines with cylinders disposed in opposition, on either side of one or more crankshafts without departing from the spirit of the invention. Accordingly, the invention is limited only by the following claims.

I claim:
1. An internal combustion engine including at least one cylinder with longitudinally-separated exhaust and intake ports, a pair of pistons disposed in opposition in a bore of the cylinder, and piston linkages coupled to the pistons, comprising:
   rocker arms for coupling the piston linkages to a crankshaft;
   a fixed, stationary pivot shaft;
   in which each rocker arm is pivoted on the pivot shaft by an eccentric pivot bearing received in a pivot bearing seat in the rocker arm, and each eccentric pivot bearing is constituted of an eccentric sleeve that fits around the pivot shaft;
   a pivot bearing actuator engaging the eccentric pivot bearing for varying a rotational position of the eccentric pivot bearing on the pivot shaft,
   a gallery in the pivot shaft, extending in an axial direction of the pivot shaft;
   one or more sets of first radial holes extending in an annular direction in the pivot shaft at each pivot location, each first radial hole extending from the gallery to the side surface of the pivot shaft; and,
   one or more sets of second radial holes extending in an annular direction in each eccentric pivot bearing;
   in which the numbers of first and second radial holes, and the pitches between the holes, are chosen such that at any position to which the eccentric radial bearing is rotated, at least one second hole in each eccentric pivot bearing overlaps at least one first hole at the corresponding rocker arm location on the pivot shaft.

2. The internal combustion engine of claim 1, further comprising:
   the eccentric sleeve having an outer diameter (OD) with a first center axis and an inner diameter (ID) with a second center axis; and,
   the first and second center axes being offset from each other.

3. The internal combustion engine of claim 2, further comprising the first and second center axes being offset from each other by a distance that defines an eccentric aspect of the eccentric sleeve.

4. The internal combustion engine of claim 1, further comprising:
   a rotatable control shaft with multiple drive gears; and,
   each eccentric sleeve including a ring gear flange in driving engagement with a drive gear of the control shaft.

5. The internal combustion engine of claim 1, in which the pivot shaft is closed at both ends for receiving lubricating oil supplied under pressure.

* * * * *